United States Patent [19]

Verdier et al.

[11] Patent Number: 4,576,880

[45] Date of Patent: Mar. 18, 1986

[54] BATTERY PACK

[75] Inventors: Alain Verdier, Ste Foy les Lyon; Gilbert Charton, Dardilly, both of France

[73] Assignee: Black & Decker Inc., Newark, Del.

[21] Appl. No.: 719,320

[22] Filed: Apr. 3, 1985

[30] Foreign Application Priority Data

Apr. 6, 1984 [FR] France ............................... 84 05471

[51] Int. Cl.$^4$ ............................................. H01M 2/10
[52] U.S. Cl. ...................................... 429/99; 429/156; 429/157; 429/158; 429/160
[58] Field of Search ..................... 429/149, 156–160, 429/99

[56] References Cited

U.S. PATENT DOCUMENTS 3,715,240  2/1973  Hamel ............................. 136/134 P
3,956,019  5/1976  Mabuchi et al. ................... 136/132

Primary Examiner—Charles F. LeFevour
Attorney, Agent, or Firm—Ronald B. Sherer; Edward D. Murphy; Harold Weinstein

[57] ABSTRACT

An electric battery pack is manufactured by a process whereby an outer insulating casing has contact strips partly inserted through apertures in opposed sides thereof adjacent a closed bottom thereof. A series arrangement of connected batteries is inserted into the casing until the positive and negative poles of the series arrangement engage against the contact strips. A cover having integral inward projections is pressed towards and against the casing to close an open end thereof, the inward projections being stressed and deforming against end batteries to secure all the batteries immovably in position, and the cover being welded to the casing. The inner ends of the contact strips are then welded or soldered to the poles of the series arrangement from outside the casing through access orifices in the closed bottom of the casing.

12 Claims, 30 Drawing Figures

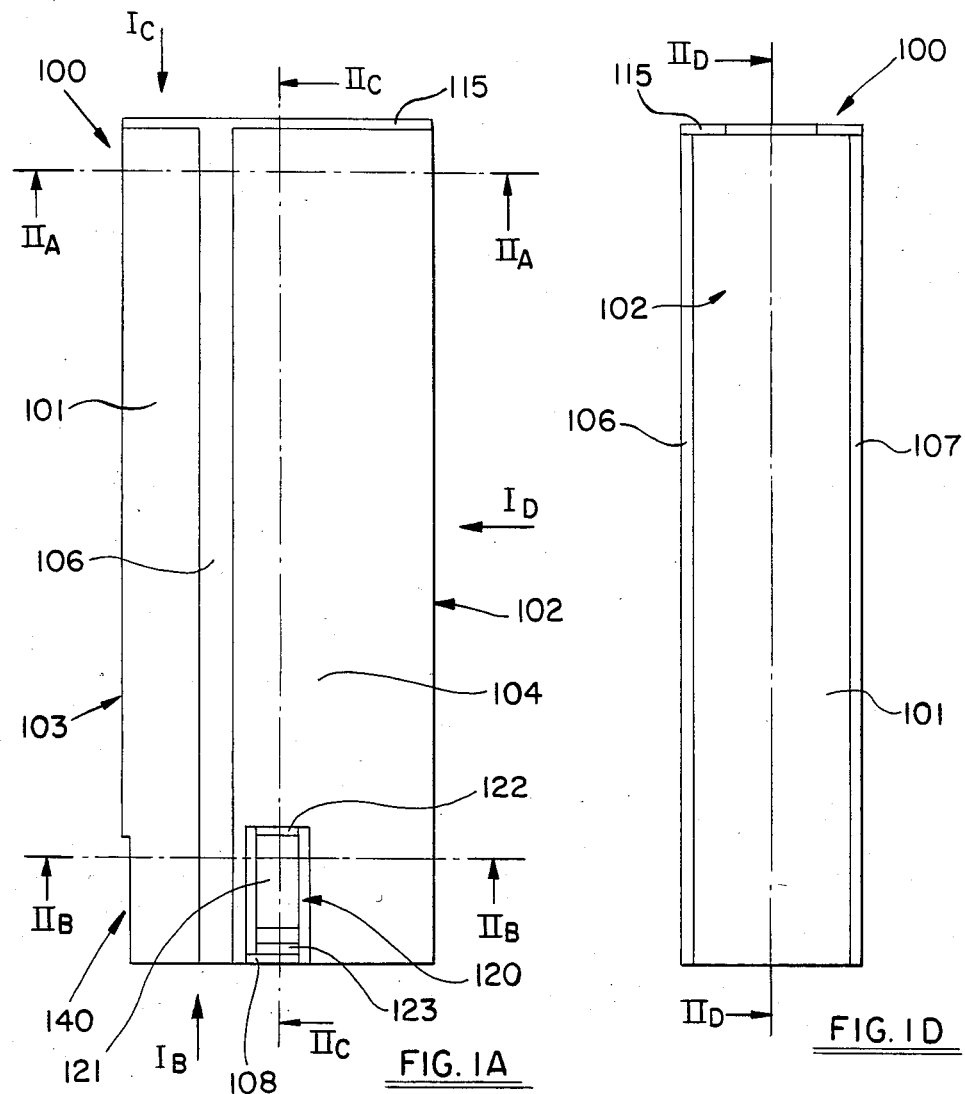
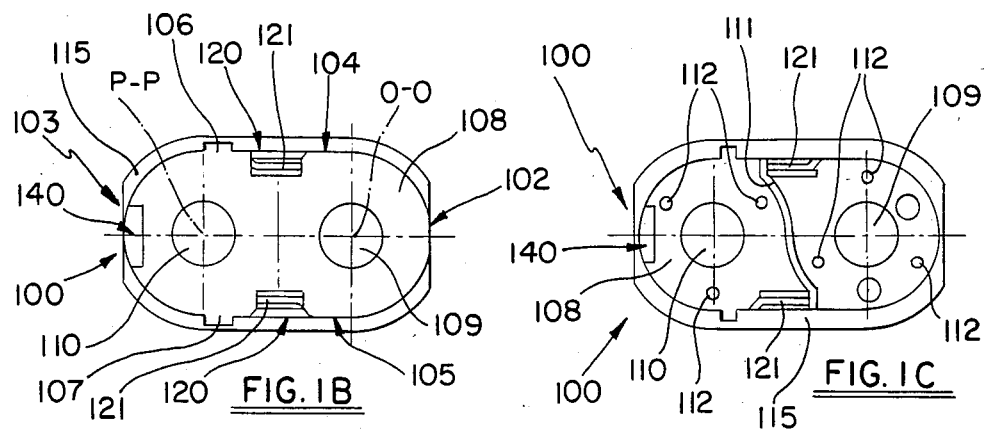

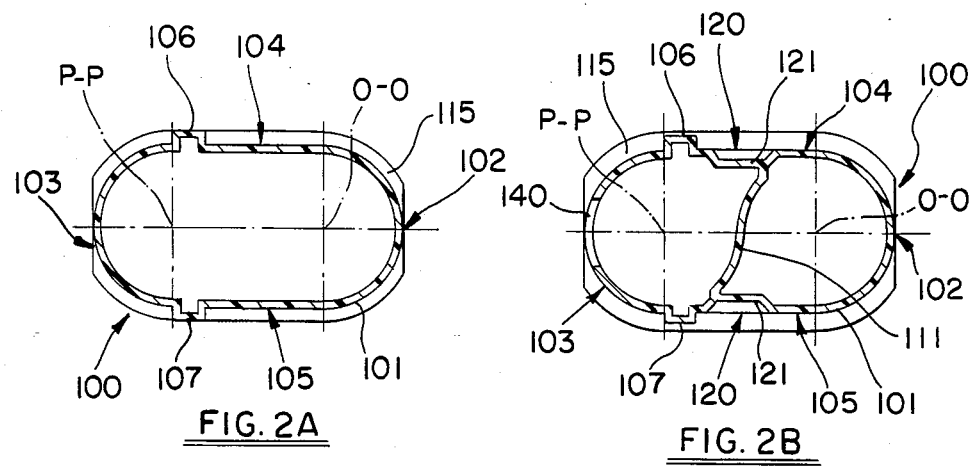
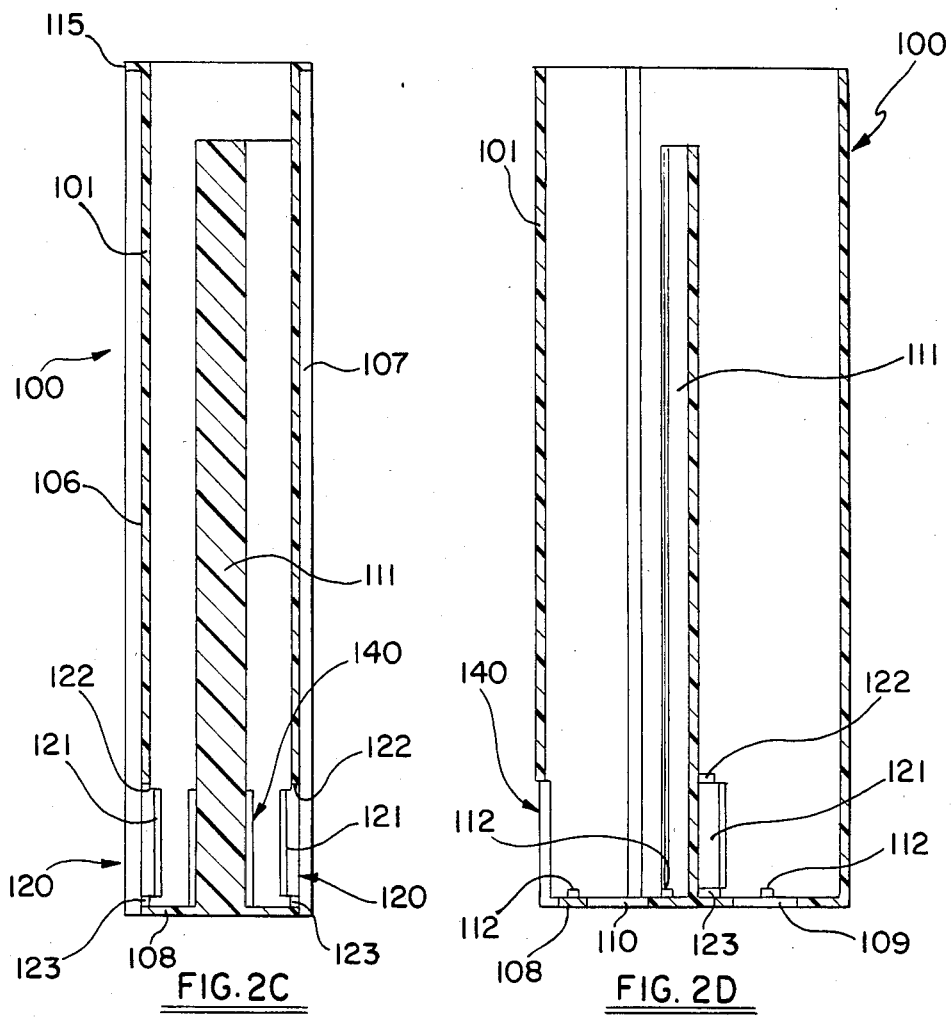

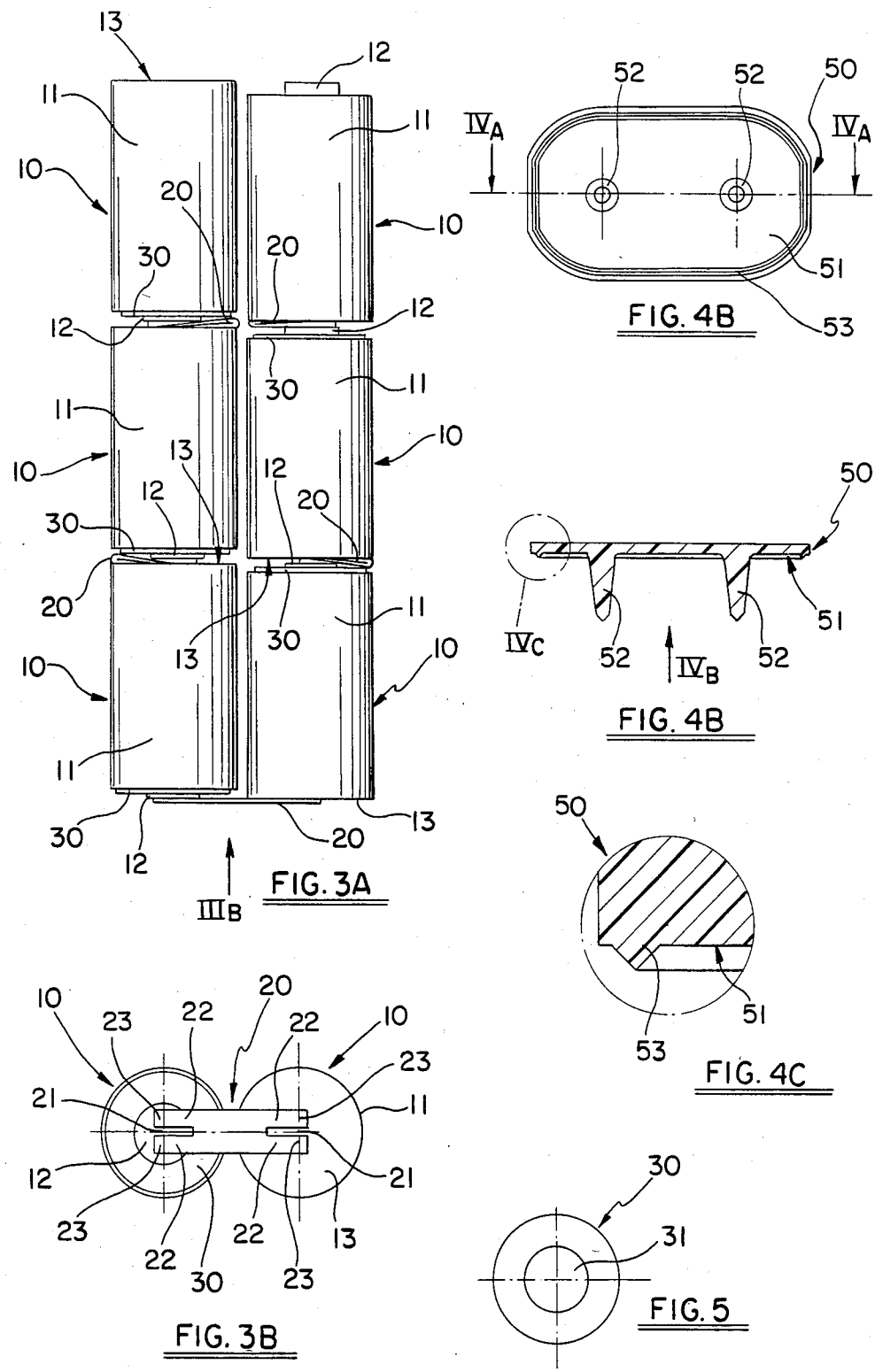

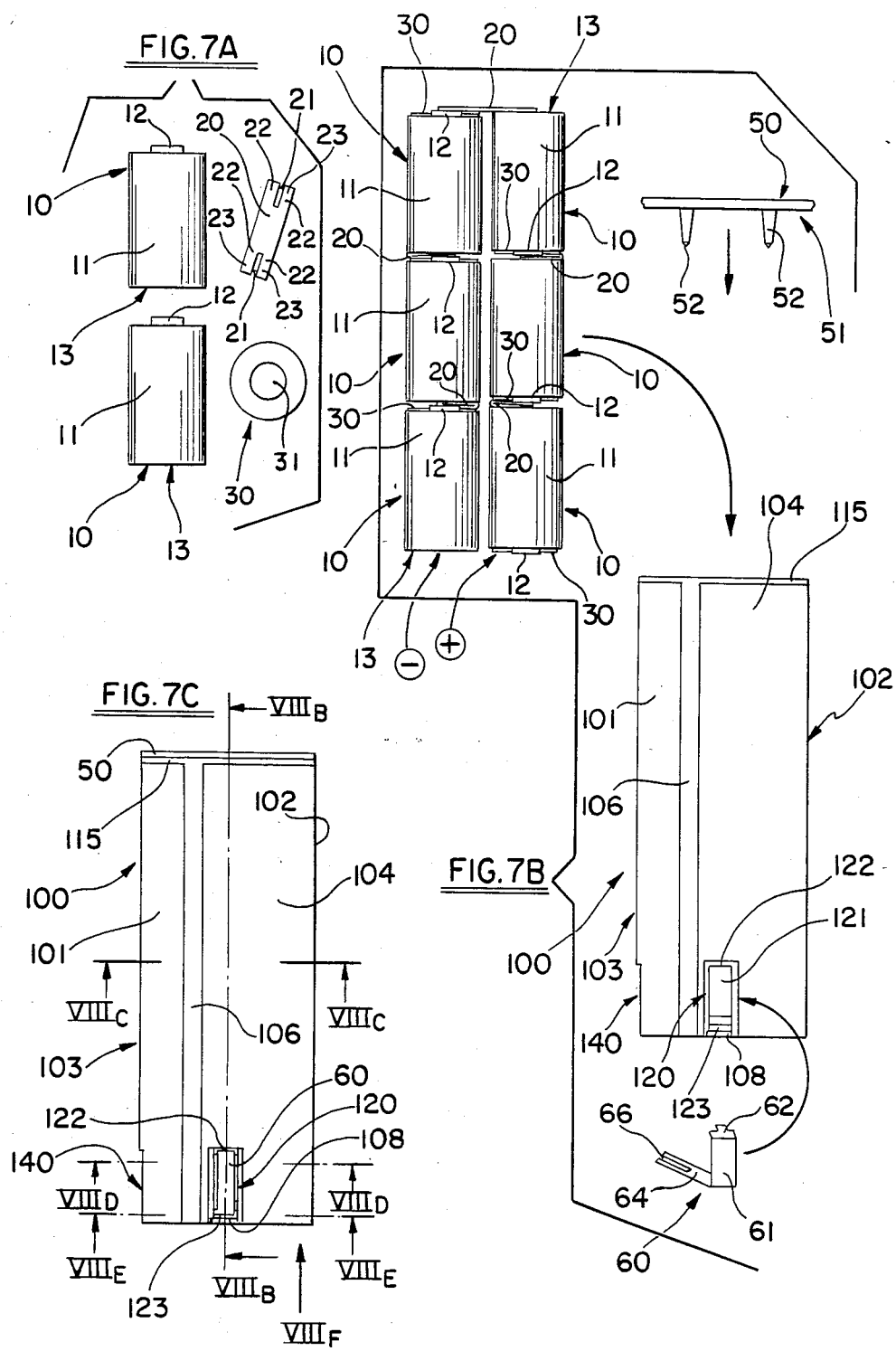

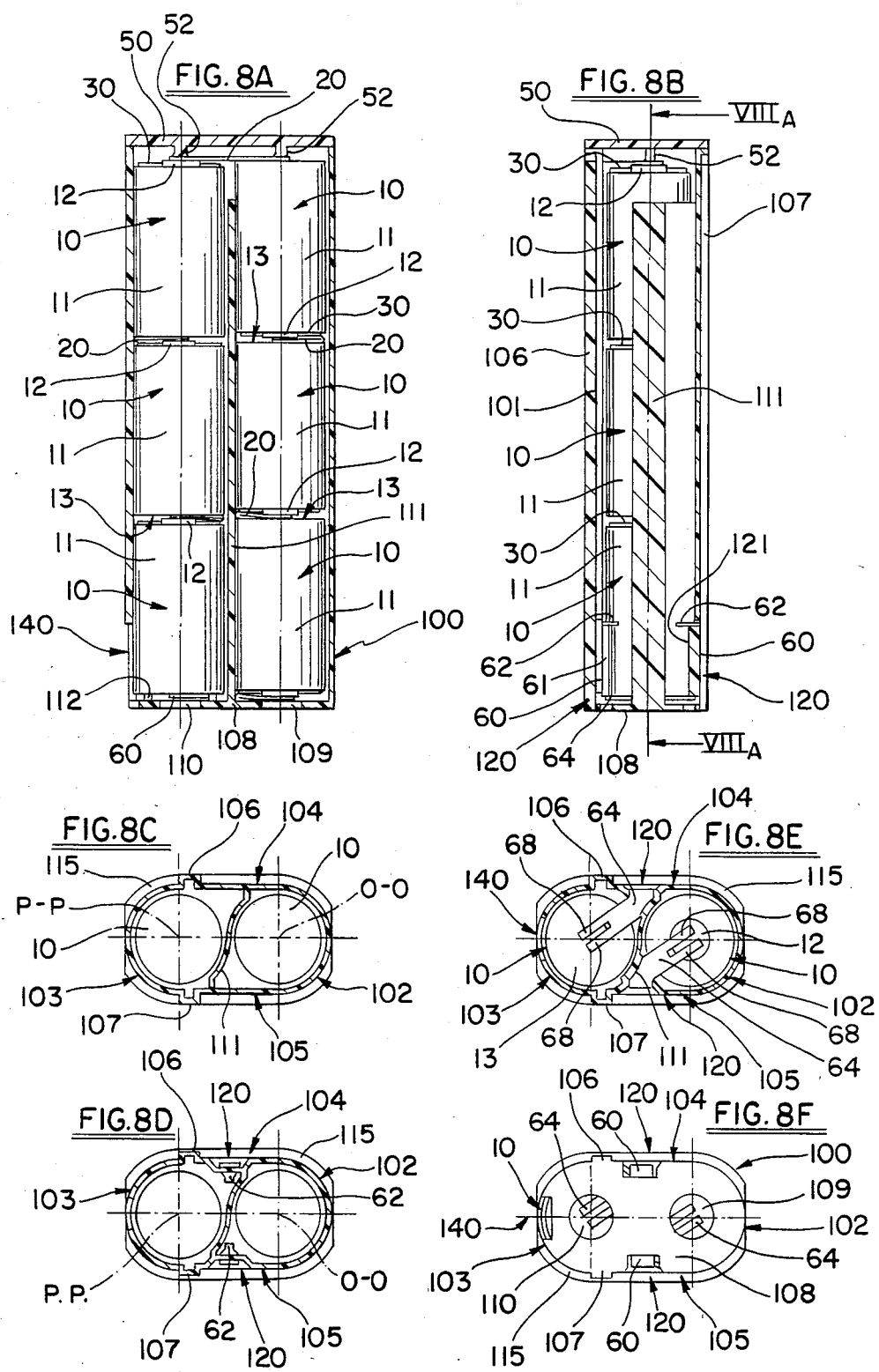

BATTERY PACK

FIELD OF THE INVENTION

The invention relates to rechargeable batteries, and more particularly to a process for the manufacture of an electric battery pack comprising a plurality of rechargeable battery cells and the battery pack itself.

The invention relates particularly to battery packs for portable electrical apparatus.

BACKGROUND OF THE INVENTION

Electric battery packs are formed by a plurality of individual rechargeable battery cells connected in series. In general, each individual rechargeable cell comprises an electrically conductive casing which receives chemicals adapted to react to supply an electric current between an electrically conductive disc-shaped end wall, rigidly connected to one end of the casing, and an electrically conductive stud which is disposed at the other end of the casing and is electrically insulated therefrom.

A technique nowadays commercially used for producing such rechargeable battery packs comprises:

(a) connecting the battery cells electrically in series to form a preassembly;

(b) wrapping an insulating sheath around the preassembly so as to insulate the electrically conductive casings from one another and ensure a mechanical connection between the various elements; and (c) placing the preassembly thus wrapped in a casing, such casing mainly performing a protective function and if necessary facilitating the establishment of electrical connections with the opposite end poles of the series arrangement of the cells.

However this technique has numerous disadvantages, including, for example, its complexity, which more particularly requires specialist personnel and results in long manufacturing times, a prohibitive cost for a large number of applications, and very mediocre reliability.

More particularly, the operation of winding or forming the insulating sheath around the preassembly of cells to insulate the casings, and ensure a mechanical connection thereof, can be long and complex when the cells have to be disposed in the form of parallel rows to obtain a compact battery pack.

Also, the commercial available rechargeable battery cells have wide tolerance variations, which correspondingly complicates the assembly processes.

In a modification of the above process, it has been proposed in U.S. Pat. No. 3,956,019 to weld electrical connecting plates to the output poles of a series arrangement of batteries, this welding being performed through openings in an end plate of the battery pack after the batteries and this end plate have been enveloped in a thermo-contractive synthetic resinous film. However, this still involves a rather complicated assembly procedure, not readily adaptable for automatic or semi-automatic assembly by machinery, and also relies on a film sheath to hold the battery pack together.

SUMMARY OF THE INVENTION

It is an object of the present invention to provide an improved method of assembling a battery pack using some simplified assembly steps, and assembly steps at least some of which are more readily adaptable for carrying out by machinery.

A feature by which this object is achieved is by inserting contact strips through apertures in the side walls of a casing of the battery pack, and then securing a closure lid on the casing after the batteries are installed.

Accordingly, therefore, the present invention provides a method of manufacturing a battery pack containing a plurality of rechargeable batteries, comprising the steps of taking a casing of electrically insulating material having a closed bottom and an open top end, the closed bottom having two access orifices therethrough, and opposed side walls of said casing having apertures adjacent said closed bottom, inserting contact flanges of two contact strips through said apertures so that said contact flanges extend parallel to said closed bottom and extend above said access orifices and a portion of each contact strip is disposed externally of said casing, inserting said plurality of batteries into said casing through said open end, and contacting a positive pole of one of said batteries with one of said contact flanges, and contacting a negative pole of another of said batteries with another of said contact flanges, closing said open end with a cover, securing said cover to said casing so that said cover presses said batteries towards said closed bottom and said positive and negative poles firmly engage said contact flanges, and attaching said contact flanges to said poles by a heat process effected from outside said casing through said access orifices.

The cover preferably has deformable projections of electrically insulating material which extend into said casing, and the cover may be pressed against the casing before being secured to deform the projections, the deformed projections pressing the batteries towards the closed bottom.

Preferably, the contact strips each have a second shorter flange spaced from the contact flange by a web portion, and these second flanges may be inserted through further apertures in the side walls with the web portions remaining exposed externally of the casing.

Preferably, all the flanges have projections thereon, and these projections are latched over inside edges of the apertures to secure the contact strips to the casing.

The heat process step preferably comprises welding or soldering.

Another object of the invention is to provide a battery pack which is simple in construction yet robust and reliable in use.

Therefore, according to another aspect of the present invention there is provided a battery pack, comprising a casing having a closed bottom, opposed side walls, and an open top, said closed bottom having two access orifices therein, each of said opposed side walls having an aperture therein adjacent said closed bottom, a plurality of rechargeable batteries in said casing connected in a series arrangement with opposite poles of the series arrangement being located adjacent said closed bottom in alignment with said access orifices, two contact strips each having a portion externally of said casing and a contact flange extending into said casing through a respective one of the apertures, each contact flange extending parallel to said closed bottom and over one of said access orifices and being rigidly secured to a respective one of said poles, and a cover closing said open top and secured to said casing, said cover pressing said series arrangement of batteries towards said contact flanges to prevent movement of said series arrangement in said casing.

Preferably, each contact strip has two flanges connected by a web portion, and these two flanges penetrate through a pair of apertures in a side wall recess, the flanges having means for latching them in position with the web portion lying in the recess and being exposed externally of the casing.

As will be appreciated, the present invention eliminates the necessity of winding or forming an insulating sheath around the battery cells. Moreover, a correct and constant electrical connection is ensured between the individual batteries of the series arrangement on the one hand, and such arrangement and the contact strips on the other hand.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 1A is a side elevation of the outside of the casing of a battery pack in accordance with the present invention;

FIGS. 1B, 1C and 1D are views of the casing of FIG. 1A from below, above and another side, respectively, in the respective directions of the arrows $I_B$, $I_C$ and $I_D$ in FIG. 1A;

FIGS. 2A and 2B are cross-sections through the casing, taken along the lines $II_A$—$II_A$ and $II_B$—$II_B$ in FIG. 1A;

FIGS. 2C and 2D are longitudinal sections through the casing taken on the lines $II_C$—$II_C$ and $II_D$—$II_D$ in FIGS. 1A and 1D respectively;

FIG. 3A shows a series arrangement of a plurality of interconnected rechargeable battery cells;

FIG. 3B is an end view of the series arrangement of cells of FIG. 3A taken in the direction of the arrow $III_B$ in FIG. 3A;

FIG. 4A is a central sectional view of a cover for completing the casing and taken on the line $IV_A$—$IV_A$ in FIG. 4B.

FIG. 4B is an underneath plan view of the cover of FIG. 4A taken in the direction of the arrow $IV_B$ in FIG. 4A;

FIG. 4C is an enlarged detail of the portion of the cover within the circle $IV_C$ in FIG. 4A;

FIG. 5 is a plan view of an insulating washer used in the series arrangement of FIG. 3A;

FIGS. 7A, 7B and 7C illustrate the main steps in the assembly process of the battery pack according to the invention;

FIG. 7A shows some of the components used in making up the series arrangement of battery cells (which series arrangement is shown inverted in FIG. 3A);

FIG. 7B illustrates the assembly of one of the contact strips and the series arrangement of battery cells (correctly orientated) into the casing and the assembly of the cover to the casing;

FIG. 7C shows a side view of the assembled battery pack;

FIG. 8A is a longitudinal section through the assembled battery pack taken on the line $VIII_A$—$VIII_A$ of FIG. 8B;

FIG. 8B is a longitudinal section of the assembled battery pack taken on the line $VIII_B$—$VIII_B$ of FIG. 7C;

FIGS. 8C, 8D and 8E are sectional views through the assembled battery pack taken on the lines $VIII_C$—$VIII_C$, $VIII_D$—$VIII_D$, and $VIII_E$—$VIII_E$ in FIG. 7C, respectively; and FIG. 8F is a plan view from below taken in the direction of the arrow $VIII_F$ in FIG. 7C of the assembled battery pack.

DETAILED DESCRIPTION OF THE PREFERRED EMBODIMENTS

Figure 6A:
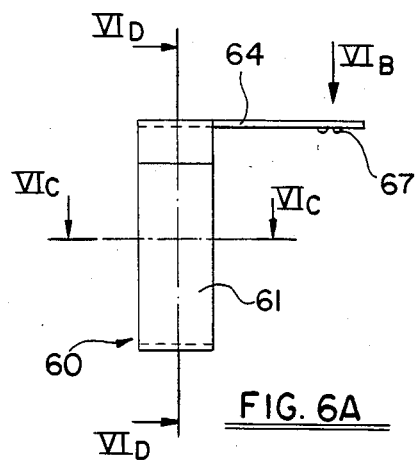
FIG. 6A is an inverted side view of an electrically conductive contact strip used in the assembly of the battery pack in accordance with the present invention.

The various components of the preferred embodiment of the battery pack will be described first, in general, in relation to FIGS. 1A through 6G, and then the preferred embodiment of manufacturing the battery pack and the assembled battery pack will, in general, be described in relation to FIGS. 7A through 8F.

To start, the structure of the casing 100 of the battery pack will be described with reference particularly to FIGS. 1A to 1D and 2A to 2D. The casing 100 is formed by an outer wall 101 bounding an elongated inner recess of constant cross-section which is adapted to receive a plurality of rechargeable battery cells, as will be explained hereinafter. More particularly, the cross-section of the casing 100, as viewed in a plane parallel to the sectional planes of FIGS. 2A and 2B, is bounded by two equal arcs of a circle connected to one another by two rectilinear segments. In other words, the outer envelope 101 of the casing 100 is bounded, on the one hand, by two sectors of cylinders 102, 103 whose respective parallel axes of revolution are reference O—O and P—P in FIG. 1B and, on the other hand, by two longitudinal parallel planes 104, 105 which extend between the aforementioned sectors and form opposed side walls of the casing 100.

The presence will also be noted of two rectilinear longitudinal ribs 106, 107 projecting from the outer surface of the side walls 104, 105. The ribs 106, 107 act as polarizing members for correctly positioning the battery pack in a user apparatus, and are off-set in relation to the plane of symmetry of the casing 100 coinciding, for example, with the sectional plane $III_C$—$III_C$ in FIG. 1A. In this way correct polarization of the battery pack in use is assured.

One of the ends of the casing 100 (lower end in FIGS. 1A and 1D) is closed by a transverse bottom wall 108, of generally oval shape, connected to the aforementioned elements 102, 103, 104 and 105. This bottom wall 108 has two circular orifices 109, 110 coaxial with the aforementioned axes O—O and P—P. The casing 100 also comprises, as illustrated more particularly in FIG. 1C, an inner longitudinal partition 111 which extends generally transversely of the side walls 104, 105 while being connected to the inner surfaces of these side walls. The partition 111 defines two parallel longitudinal compartments each adapted to receive a series of rechargeable battery cells. The partition 111 has a generally "S"-shaped cross-section, and the concavities of the partition 111 are similar in curvature to the cylindrical sectors 102, 103. Pins 112, integral with the casing bottom 108, project inwardly towards the open top of the casing.

The casing 100 also has a lip 115 projecting outwardly from the periphery of the outer wall 101 around the opening at the top of the casing. This lip 115, which extends parallel to the cross-sectional plane $II_4$—$II_4$, is truncated at each end as shown in FIGS. 1B and 1C.

The opposed side walls 104, 105 are formed adjacent their lower ends with rectangular recesses 120. These recesses 120 have a rectangular outline and extend longitudinally, parallel with the main direction of the casing, i.e. parallel with the axes O—O and P—P. The recesses 120 are symmetrically disposed. A flat member 121 parallel with the opposed side 104, 105 and off-set towards the inside of the casing defines an inner wall of each recess 120. This member 121 is connected longitudinally between one of the opposed side walls 104, 105 and the inner partition 111 (see FIG. 2B). As illustrated in FIGS. 2C and 2D, the length of the member 121 parallel to the lengthwise direction of the casing 100 is slightly less than the length of the corresponding recesses 120, so providing apertures 122, 123 in each recess 120 above and below the member 121. As will be disclosed hereinafter with respect to FIG. 7, the apertures 112, 123 are used to accommodate contact strips.

The outer wall 101 of the casing comprises a lateral opening 140 in the cylindrical sector 103 adjacent the bottom 108. The opening 140 extends in the longitudinal direction of the casing and is symmetric with respect to a plane of symmetry of the casing through the axes O—O and P—P. This aperture 140 is adapted to allow in use the establishment of contact between the side wall of one of the battery cells and an outside auxiliary member, such as a thermistor.

It should also be noted, as illustrated in FIG. 1B, that the casing bottom 108 is cut out in line with the recesses 120 in order to allow the establishment sliding electrical contact in use between resilient contact means of the user apparatus and conductive contact strips engaged over the members 121. Similarly, the casing bottom 108 is cut away in line with the opening 140.

The casing 100 is completed by a cover 50 illustrated in FIGS. 4A and 4B. The cover 50 is formed by a disk-like shell of generally oval section and having intergrally formed on its lower surface 51 two substantially frusto-conical pins which are generally parallel and project perpendicularly downwards in relation to the surface 51.

The outline of the flat shell forming the cover 50 is formed by four equal arcs connected by parallel rectilinear segments in pairs and corresponds to the outline of the casing lip 115. A rib of V cross-section extends downwardly from the underside of the cover 50 around its periphery.

When the cover 50 is adjusted in position on the open top of the casing 100, the pins 52 extend into the casing coaxially with the axes O—O and P—P. The cross-section and material of the pins 52 enable them to be slightly deformed sideways when an adquate pressure is applied to them. As will be described later, this property is used to ensure that the arrangement of rechargeable battery cells when assembled in the casing 100 are held against movement or vibration.

The casing 100 and the cover 50 are made of an electrically insulating material which is also adapted to allow assembly by thermal fusing of the cover 50 to the casing 100. Preferably, the casing 100 and the cover 50 are formed from a thermoplastic polymer or copolymer such as acrylonitrile butradiene styrene (ABS).

The structure of the electrical contact strips illustrated in FIGS. 6A to 6G will now be described. However, it should be noted that in these FIGS. the illustrated contact strip 60 is inverted from its orientation in FIGS. 7 and 8. The strips 60 each comprise a flat web 61 of rectangular outline to the ends of which are connected two flanges 62, 64 which are generally parallel with one another and extend perpendicular to the web 61, on the same side thereof. The first longer flange 64, which is a contact flange, while extending in a plane perpendicular to the direction of elongation of the web 61, is inclined at an acute angle about 45°, in relation to the plane of the web 61-as can be seen in FIG. 6B. The second and shorter flange 62 extends in a plane perpendicular to the plane of the web 61.

Each flange 62, 64 has adjacent the web 61 die-stamped dimples 63, 65, respectively, projecting inwardly towards one another. The dimples 63, 65 enable the contact strips 60 to be snapped on the members 121 of the recesses 120 when the flanges 62, 64 are respectively introduced inwardly through the apertures 122, 123. Because of the central positioning of the recesses 120 and short length of the second flange 62, the latter in no way interferes with the insertion of the rechargeable battery cells into the casing. To ensure the locking of the strips 60 on the corresponding members 121, the distance separating the flanges 62 and 64 is substantially equal to or slightly larger than the length of the member 121. Moreover, the dimples 63, 65 are provided on the flanges 62, 64 at a distance from the web 61 which is substantially equal to the thickness of the members 121.

Figure 6D:
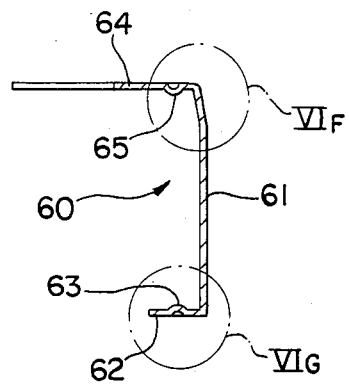
FIGS. 6C and 6D are sectional views of the contact strip of FIG. 6A taken on the lines $VI_C$—$VI_C$ and $VI_D$—$VI_D$, respectively.
Figure 6B:
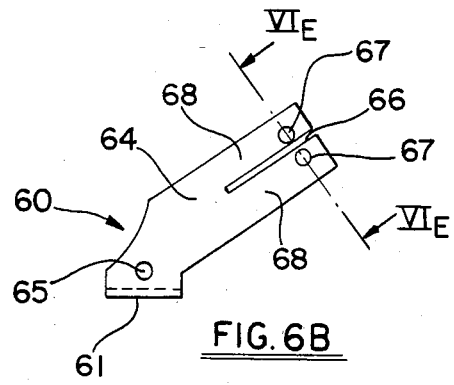
FIG. 6B is an underneath plan view of the contact strip of FIG. 6A taken in the direction of the arrow $VI_B$ in FIG. 6A.
Figure 6E:
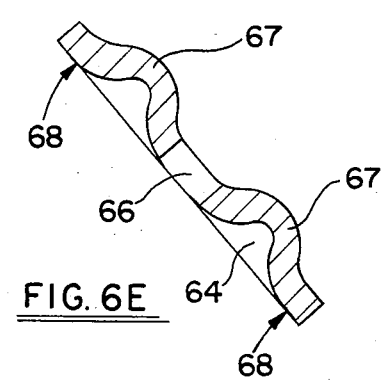
FIG. 6E is an enlarged sectional view of the contact strip taken on the line $VI_E$—$VI_E$ in FIG. 6B.
Figure 6C:
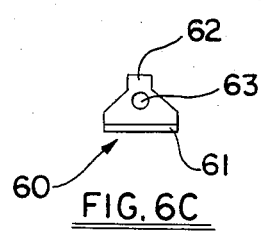
Figure 6G:
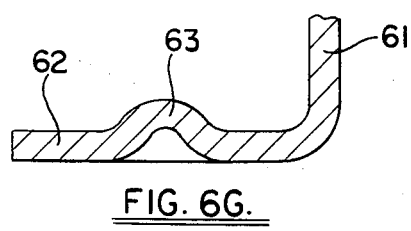
FIGS. 6F and 6G are enlarged detailed views of the portions of the contact strip encircled by the circles $VI_F$ and $VI_G$, respectively, in FIG. 6D.
Figure 6F:
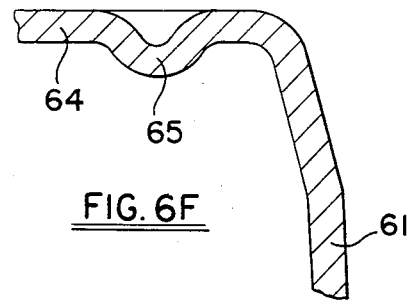

As illustrated in FIGS. 6D and 6E, the contact flange is formed at its free end with a longitudinal central slot 66 forming two parallel tongues 68 each having adjacent its end a dimple 67 projecting in the direction of the shorter flange 62. The length of the flange 64 is such that the dimples 67, after the strips 60 have been locked over the casing members 121, are disposed above the orifices 109, 110 in the casing bottom 108 (see FIG. 8F).

As shown more particularly in FIG. 3A, the individual rechargeable battery cells 10 comprise an electrically conductive cylindrical wall 11 which contains chemical means adapted to react to supply an electric current between an electrically conductive radial and disc-shaped end wall 13 and an electrically conductive stud 12 supported at the other end of the wall 11 and electrically insulated therefrom. The stud 12 is coaxial with the wall 11. The side wall 11 and end wall 13 form the negative pole (—) of the battery cell, while the stud 12 forms the positive pole (+) of the cell.

The process of assembling the battery pack will now be described with reference to FIGS. 7A, 7B and 7C.

The first stage of the process consists in electrically connecting in series a plurality of rechargeable battery cells 10 arranged in the form of two parallel rows, so that the two electric poles of the series arrangement, illustrated by the references — and + in FIG. 7B, are provided respectively at the ends of the two parallel rows of cells 10 and at the lower end of the series arrangement. To this end, insulating washers 30 in the form of rings formed with an internal bore 31 (see also FIG. 5) of diameter substantially identical to that of the stud 12 are disposed on the various cells 10 around the studs 12. The cells 10 are then positioned head to foot in pairs along side one another, i.e. the negative pole (disc-shaped surface 13) of one of the cells is disposed adjacent the positive pole (stud 12) of an adjacent cell. The various battery cells 10 are then connected in series by means of electrically conductive elements 20 shown in FIG. 3B and FIGS. 7A and 7B, so as to connect the positive pole (stud 12) of a cell 10 to the negative pole (disc 13) of an adjacent cell. The connecting elements 20 are formed by flat electrically conductive elements of generally rectangular outline the extremities of which are provided with two longitudinally extending central slots 21 each of which divide two adjacent parallel tongues 22. Similarly to the contact flange 64, each of the tongues 22 has dimples 23 to facilitate assembly by soldering the connecting elements 20 to the discs 13 and studs 12 of the battery cells 10. The length of the connecting elements 20, viewed parallel with the central slots 21, is slightly greater than the diameter of the battery cells 10, so as to provide a slight spacing between the two rows of battery cells 10, as shown in FIG. 3A. The connecting elements 20, like the contact strips 60, are made of the same material of good electrical conductivity, such as nickel or nickel plated steel.

The battery pack comprises six batteries 10. Five connecting elements 20 are used to connect the six batteries 10 in series. Except for the upper and central connecting element 20, the connecting elements 20 are bent transversely of their longitudinal direction to align the elements in threes in two parallel rows, as shown in FIG. 7B. It will be noted that the central connecting element 20 (shown in the upper part of FIG. 7B and the lower part of FIG. 3A) is secured to the upper battery cells 10 in such a way that the two rows of three batteries are slightly separated. The series arrangement of the batteries is now complete.

At the same time, two contact strips 60 are introduced laterally into the recesses 120 in the casing 100. For this purpose, the contact flanges 64 are first introduced into the apertures 123, perpendicularly to the axes O—O and P—P. Then the strips 60 are pushed into the recesses 120 to introduce the shorter flanges 62 into the apertures 122 and effect the latching of the strips 60 on the recess members 121 when the dimples 63 and 65 penetrate beyond the latter. In this assembled position, the contact flanges 64 extend transversely of the battery compartments and over the orifices 109, 110 in the casing bottom 108. The contact strips 60 are firmly secured in this position with the webs 61 resting against the outer surface of the recess members 121.

The casing 100 equipped with the contact strip 60 is then ready to receive the series arrangement of interconnected batteries, as illustrated in FIG. 7B.

This battery arrangement is then introduced into the casing 100 through the open top end thereof, the adjacent battery ends forming the positive and negative poles of the series arrangement being introduced into the casing first. The arrangement is fully inserted into the casing 100 until the positive and negative poles of the series arrangement bear respectively against the contact flanges 64. In order to limit the mechanical stresses applied to the contact flanges 64, the extreme front end faces of the leading batteries 10 come to bear against the pins 112 protruding upwardly from the casing bottom 108. The longitudinal inner partition 111 physically separates the two rows of batteries and also forms an electrical insulation barrier therebetween. These rows extend respectively coaxially with the axes O—O and P—P.

The casing must now be closed by the cover 50. As shown in FIG. 7B the cover is aligned above the open end of the casing 100. The cover 50 is then moved towards the casing 100 until the free ends of the pins 52 bear against the upper ends of the rows of batteries 10. More precisely, the free ends of the pins 52 come to bear against the central and upper connecting element 20. The cover 50 is then pressed against the casing 100 in a direction parallel with the axes O—O and P—P to deform the pins 52, as is shown in FIG. 8A, and render the batteries 10 immovable. Also, the peripheral rib 53 around the cover 50 is moved tightly against the casing 100. This phase of stressing the pins 52 by bringing together the cover 50 and the casing 100 is accompanied by a welding phase, preferably by ultrasonics, to weld the cover 50 and casing 100 together. Such welding is effected between the rib 53 and the lip 115. This application of ultrasonics is preferably also used to facilitate the deformation of the stressing pins 52. The deformation of the pins 52 and the phase of welding the cover 50 may therefore, be performed simultaneously.

In order to ensure a reliable electric contact between the contact strips 60 and the positive and negative poles of the series arrangement of batteries, the dimples 67 on the tongues 68 of the contact flanges 64 are welded or soldered to the stud 12 and the disc 13, respectively, of the lower end battery cells of the series arrangement. This welding or soldering is performed from outside the casing 100 through the orifices 109, 110 in the casing bottom 108.

The battery pack thus produced is shown ready for use in FIG. 7C and FIGS. 8A to 8F.

As the preceding description shows, the manufacturing process according to the invention is particularly simple and economical.

It will moreover be noted that the presence of the aperture 140 in the casing 100 enables a thermistor integrated with a charging system to be brought in contact with the casing 11 of the battery cell 10 forming the negative pole of the battery pack, for use in controlling the pack charging process. It will also be noted that the structure of the longitudinal recesses 120 in the flat side walls 104, 105 and also in the casing bottom 108, as is shown more particularly in FIGS. 1B and 8F, allows the establishment of a sliding contact between the contact strips 60 and contacts in a user apparatus as the battery pack in inserted longitudinally into an appropriate pocket in the user apparatus.

Tests carried out on the above battery pack when containing cadmium-nickel rechargeable batteries proved very satisfactory. The reliability of these battery packs is believed to be due to the small number of components used to produce them, and also to the form of the electrical contacts established inside the packs.

The low cost of manufacture is due to the simplicity and rapidity of assembly, requiring merely members to be displaced in two directions at right angles to one another and a supply of heat energy by welding. This facilitates assembly by unskilled labour. Moreover, it facilitates assembly by machinery.

Lastly, it will be noted that the structure of the assembly casing according to the invention enables battery cells to be used which have wide physical tolerances, while ensuring that they are perfectly secured immovably in position. As a result, the assembly is free from vibration. This improves the reliability of the system.

The above described embodiments, of course, are not to be construed as limiting the breadth of the present invention. Modifications, and other alternative constructions, will be apparent which are within the spirit and scope of the invention as defined in the appended claims.

What is claimed is:

1. A battery pack, comprising:
a casing having a closed bottom, opposed side walls, and an open top;
said closed bottom having two access orifices therein;
each of said opposed side walls having an aperture therein adjacent said closed bottom;
a plurality of rechargeable batteries in said casing connected in a series arrangement with opposite poles of the series arrangement being located adjacent said closed bottom in alignment with said access orifices;
two contact strips each having a portion externally of said casing, said contact strips connected to contact flanges extending into said casing through a respective one of the apertures, each contact flange extending parallel to said closed bottom and over one of said access orifices and being rigidly secured to a respective one of said poles; and
a cover closing said open top and secured to said casing, said cover pressing said series arrangement of batteries towards said contact flanges to prevent movement of said series arrangement in said casing.

2. The battery pack of claim 1, wherein the flanges are rigidly secured to said poles by welding.

3. The battery pack of claim 1, wherein the flanges are soldered to said poles.

4. The battery pack of claim 1, wherein said cover has deformably projections of electrically insulating material extending into said casing and deformed against said batteries, the deformed projections pressing said batteries towards said closed bottom.

5. The battery pack of claim 1, wherein said contact strips each have a second shorter flange spaced from said contact flange by a web portion, the second flanges extending into said casing through further apertures in said side walls with the web portions exposed externally of said casing.

6. The battery pack of claim 5, wherein the apertures are located in pairs in recesses in said side walls, and said web portions are located in said recesses.

7. The battery pack of claim 5, wherein said contact flanges and said second flanges have projections thereon which engage over edges of said apertures to latch said contact strips to said casing.

8. The battery pack of claim 1, wherein said cover and said casing comprise thermoplastic material, and said cover is secured to said casing by ultrasonic welding.

9. The battery pack of claim 1, wherein said batteries are assembled in a series arrangement in two parallel rows, and further comprising an internal partition in said casing separating the latter into two compartments each housing one of said parallel rows.

10. The battery pack of claim 1, wherein each said contact flange has at its end two parallel tongues separated by a longitudinal central slot, each tongue having a dimple thereon contacting one of said poles, and each said contact flange extends inwardly from the respective side wall at an accute angle thereto.

11. The battery pack of claim 1, wherein said closed bottom is provided with support pins protruding inwardly and engaging said batteries adjacent said poles.

12. The battery pack of claim 11, wherein said casing has asymmetrically located ribs extending along said side walls to correctly orientate the battery pack when inserted in use in a user apparatus, and said casing has an opening in a side wall portion adjacent said closed bottom, a body portion of one of said batteries being exposed by said opening to enable in use contact between said body portion and an auxiliary member such as a thermistor.

* * * * *